(12) United States Patent  
Jönsson

(10) Patent No.: US 8,789,521 B2  
(45) Date of Patent: Jul. 29, 2014

(54) SAW FOR CONSTRUCTION CUTTING WORK

(75) Inventor: Andreas Jönsson, Åsbro (SE)

(73) Assignee: Husqvarna AB, Huskvarna (SE)

( * ) Notice: Subject to any disclaimer, the term of this patent is extended or adjusted under 35 U.S.C. 154(b) by 230 days.

(21) Appl. No.: 13/394,082

(22) PCT Filed: Sep. 2, 2009

(86) PCT No.: PCT/SE2009/000398  
§ 371 (c)(1),  
(2), (4) Date: May 16, 2012

(87) PCT Pub. No.: WO2011/028154  
PCT Pub. Date: Mar. 10, 2011

(65) Prior Publication Data  
US 2012/0234305 A1   Sep. 20, 2012

(51) Int. Cl.  
*B28D 1/04* (2006.01)

(52) U.S. Cl.  
USPC .......... 125/13.03; 125/13.01; 125/15; 125/18

(58) Field of Classification Search  
CPC ............ B28D 1/121; B28D 1/04; B28D 1/10; B28D 1/12; B25F 5/00; B16H 35/00; B24B 47/30  
USPC ............ 125/13.01, 15, 18, 20, 13.03; 83/591; 451/360; 408/133  
See application file for complete search history.

(56) References Cited

U.S. PATENT DOCUMENTS 2,067,177 A * 1/1937 Edgar .............................. 451/48  
4,305,190 A * 12/1981 Flair ............................. 29/90.6  
(Continued)

FOREIGN PATENT DOCUMENTS

DE 19540459 A1 5/1996  
GB 704748 A 3/1954  
JP 58028045 A 2/1983  
WO 2007082065 A2 7/2007

OTHER PUBLICATIONS

International Search Report, International Application PCT/SE2009/000398, mailed May 5, 2010, pp. 1-5.

(Continued)

*Primary Examiner* — George Nguyen  
(74) *Attorney, Agent, or Firm* — Novak Druce Connolly Bove + Quigg LLP

(57) ABSTRACT

A saw (1) being portable and/or wheeled, such as a wall saw, floor saw or masonry saw, comprising a rotatable circular saw blade (3), a drive motor (5) with an motor output shaft (9) for rotating the saw blade (3), and a transmission (20) for interconnecting the motor output shaft (9) to the rotatable saw blade (3) in order to change an unsuitable high speed and low torque combination of the motor output shaft (9) into a more useable lower speed and higher torque combination at the rotatable tool (3), wherein the transmission (20) comprises two adjustable friction saw protective clutches in parallel, which can be set at a desired predetermined value, so as to limit the maximum size of the forces that the teeth and gears of the transmission (20) are exposed to. No over dimensioning is necessary, and the transmission (20) will make out fine in rough environments. The transmission may be of single-speed or two-speed type.

26 Claims, 8 Drawing Sheets

(56) References Cited

U.S. PATENT DOCUMENTS

| | | | |
|---|---|---|---|
| 4,550,501 A * | 11/1985 | Moores et al. | 30/393 |
| 5,653,218 A | 8/1997 | Sakamoto | |
| 5,887,579 A | 3/1999 | Eriksson | |
| 6,955,167 B2 | 10/2005 | Baratta | |
| 7,290,964 B2 * | 11/2007 | Hsieh | 408/133 |
| 8,118,018 B1 * | 2/2012 | Sherment | 125/13.01 |
| 2006/0189258 A1 | 8/2006 | Schaer | |
| 2006/0201492 A1 | 9/2006 | Baratta | |
| 2007/0163412 A1 | 7/2007 | Baratta | |
| 2009/0078091 A1 * | 3/2009 | Samudosky | 81/57.11 |
| 2009/0183722 A1 * | 7/2009 | Marques et al. | 125/13.01 |
| 2012/0060664 A1 * | 3/2012 | Ha | 83/591 |

OTHER PUBLICATIONS

Written Opinion, International Application PCT/SE2009/000398, mailed May 5, 2010, pp. 1-12.

International Preliminary Report on Patentability, International Application PCT/SE2009/000398, mailed Nov. 8, 2011, pp. 1-10.

* cited by examiner

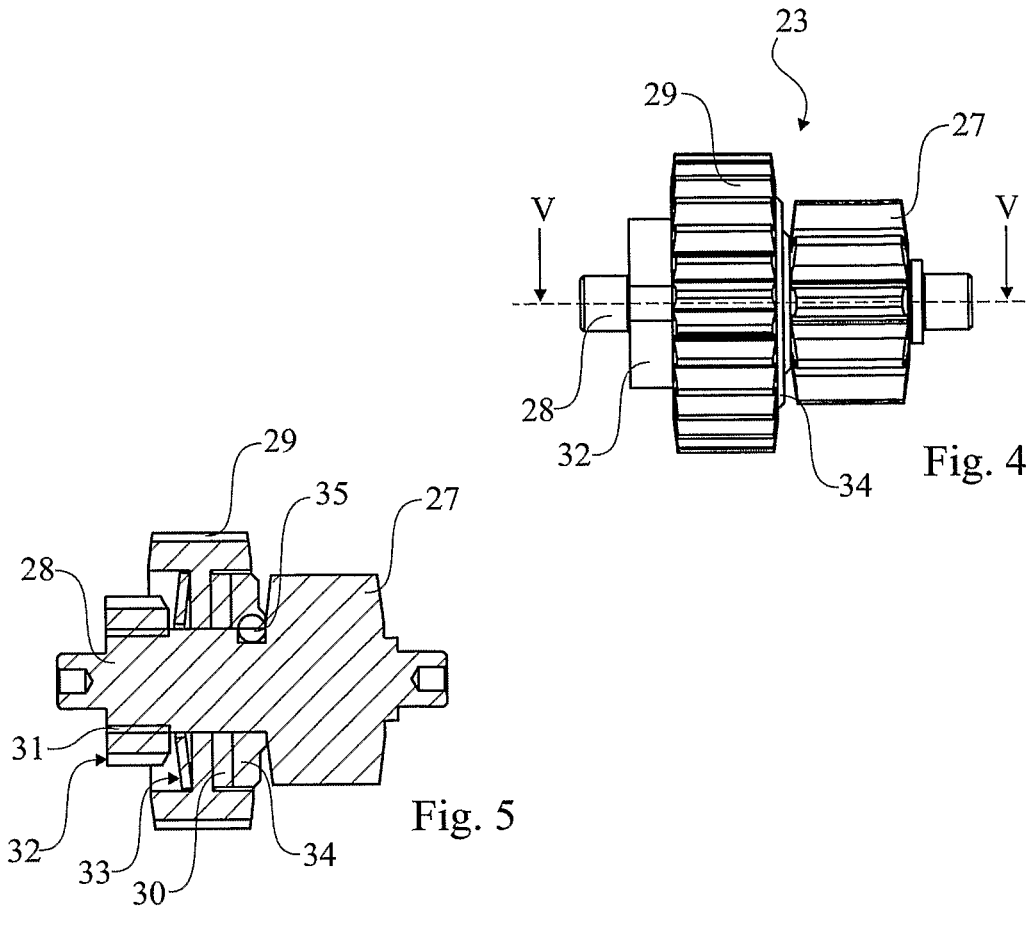
Fig. 4
Fig. 5
Fig. 6
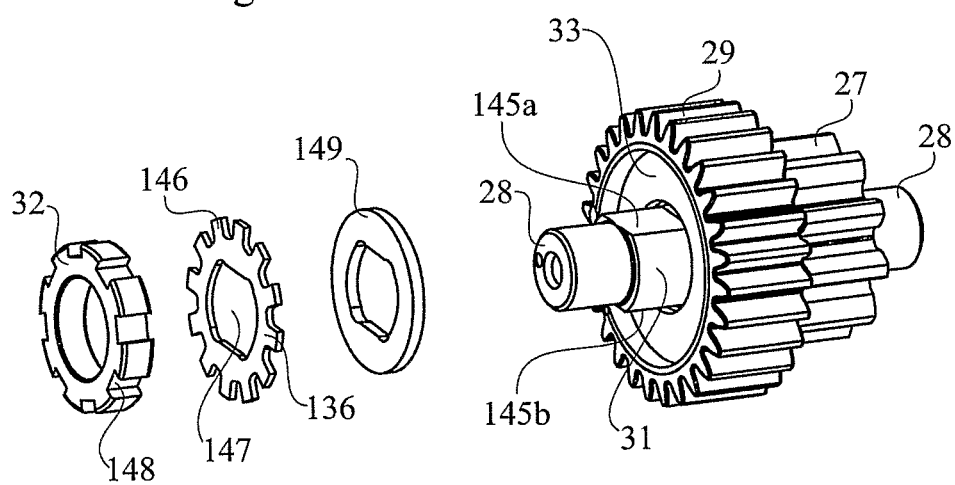

SAW FOR CONSTRUCTION CUTTING WORK

CROSS-REFERENCE TO RELATED APPLICATIONS

This application is a national stage entry of PCT/SE2009/000398, which was filed on Sep. 2, 2009, said application is expressly incorporated herein in its entity.

TECHNICAL FIELD

The present invention relates to a saw being portable and/or wheeled, such as a wall saw, floor saw or masonry saw comprising a rotatable circular saw blade, a drive motor with an motor output shaft for rotating the saw blade, and a transmission for interconnecting the motor output shaft to the rotatable saw blade in order to change an unsuitable high speed and low torque combination of the motor output shaft into a more useable lower speed and higher torque combination at the rotatable tool.

BACKGROUND ART

Construction machinery is used in renovating, reconstructing and extending buildings, for example. Wall saws are used for cutting and extending openings for doors, windows and light wells, etc., corrective work on facades, partition walls and garden walls, etc., and controlled demolition of concrete. Floor saws are wheeled and normally used for cutting in concrete floors. Wall saws, floor saws masonry saws and similar construction machinery have a drive motor, usually electric, and a rotary tool driven by the motor. In a wall saw or floor saw, the tool is a circular saw blade equipped with cutting diamond segments. Generally, heavy duty wall saws are driven hydraulically, see U.S. Pat. No. 6,955,167 B2, US 2006/0201492 A1, US 2007/0163412 A1, and U.S. Pat. No. 5,887,579, for example. However, hydraulic wall saws are comparatively heavy and not easy to set up, and comparatively low-weight electric wall saws, such as the one disclosed in US 2006/0189258 A1, for example, have been introduced on the market. Such an electric wall saw is usually driven by an induction motor running at a specifically set rotational speed for maximum power output. The speed for maximum power output is usually in the order of magnitude between 15,000 rpm and 30,000 rpm requiring a planetary gear set or the like for reducing the speed to a suitable rotational speed for the saw blade. Planetary gears are costly and would usually require an oil pump for sufficient supply of lubrication or splash lubrication. Further, it is usually desirable to run the wall saw so that the cutting segments get a same optimal peripheral speed. Saw blades of different diameters therefore requires that the transmission ratio from the induction motor to the saw blade be variable. Since the rotational speed for maximum power output of such an induction motor is fixed, a mechanical gearbox with many gears or a variator is also required, e.g. a gearbox with one mechanical gear for each blade diameter to be used. These solutions have several drawbacks, such as being costly, heavy, and space requiring, as well as being in need of thorough service regularly.

A portable rotary cutting machine for stone is disclosed in GB 704 748 A. It has a circular saw blade and a drive motor connected to the saw blade via a transmission with an adjustable friction clutch.

JP 58-028045 A relates to a torque limiter holding an internal gear of a planetary gear speed change device through friction.

An electric-powered stone cutter having a motor and a transmission is disclosed in U.S. Pat. No. 5,653,218 A1. The motor axis is located in the plane of the saw blade, and the transmission includes an elongated drive shaft extending parallel to the saw blade for transferring the power from the motor from outside the periphery of the saw blade to the center thereof.

US 2007/0180709 A1 discloses a handheld circular saw, A motor housing supports the motor and a transmission mechanism for transferring energy from the motor to the rotary saw blade. A handle assembly is provided for moving the saw with respect to a work piece. The handle assembly is rotatable relative to the saw blade housing during operation of the motor.

DE 10 2006 018 262 (A1) relates to an electric motor for e.g. sawing of plate-shaped bodies, has disk-shaped rotor with asymmetrically arranged rotor disk, and permanent magnets fastened at rotor disk and at processing and sawing tools.

A wall saw usually includes a rack, i.e. a toothed bar or rod, intended to be attached to and equidistantly spaced from the wall or floor, which is to be sawed through. A carriage carries a drive motor for the circular saw blade and is movable along the rack by means of another motor. Normally the wall saw can be remotely controlled for safety and comfort of the operator. The saw blade is mounted at the free end of a pivotal arm attached to the carriage and housing a transmission for transferring the rotation of the drive motor shaft to the saw blade. The pivotal arm, or transmission housing, is swung towards or away from the wall by a third motor. The transmission usually includes a first gear mounted on the motor output shaft of the drive motor, and a second gear having a gear output shaft, on which the saw blade is intended to be mounted. The second gear may be drivingly connected to the first gear by a chain or, preferably, by one or more interposed gears. However, in case some unexpected event causes an immediate stop of the rotation of the exterior forces, and the teeth and gears have to be dimensioned to stand such forces. As it is difficult to know the size of such forces, the teeth and gears usually are greatly oversized.

SUMMARY OF THE INVENTION

An object of the present invention is to provide a saw, in which the forces that may act on the teeth and gears of its transmission are limited and known, so that the latter do not have to be greatly oversized. Thereby also the loads the rotating parts of the motor will be reduced.

In saws of the kind referred to in the first paragraphs above, this object is achieved in that in accordance with the present invention the transmission of the saw comprises two adjustable friction saw protective clutch in parallel, each being clamped by a nut, and nut locking means are provided for locking the nut against unintentional rotation.

An adjustable friction clutch protects the wall saw or other construction machine against large exterior forces, and by setting the adjustable friction clutch at a desired predetermined value, a possibility to limit the maximum size of the forces that the teeth, gears and bearings are exposed to is provided. Thereby, the transmission may be made more compact and less heavy. The need for over-dimensioning is hereby reduced. Advantageously, no over-dimensioning is necessary, and the transmission will make out fine in rough environments.

Further, a transmission having two friction clutches will have a larger tooth engagement than a transmission having only a single friction saw protection clutch, and the transmission assembly can be made more compact. Still there is freedom to design the transmission so as to provide also an arm-shaped housing of a length sufficient for proper positioning of the saw blade. More specifically, the transmission preferably is mounted in an arm-shaped housing, which can be turned on a pivotal axis that is coaxial with a rotation axis of the motor output shaft of the motor.

In a preferred embodiment, the transmission has a first gear arranged on the motor output shaft, two first gear assemblies mounted to be driven in parallel by the first gear, and a common second gear arranged to be driven by the two first gear assemblies in parallel. The second gear has a gear output shaft, on which the saw blade is intended to be mounted, and each first gear assembly includes one of said adjustable friction saw protection clutches. This design contributes to a compact structure of the transmission.

Although a drive chain might be used for transferring the rotary force to the second gear, it is recommended that a third gear is mounted interposed between the first gear assemblies and the second gear to be driven by the first gear assemblies and drive the second gear. Gear transmissions are more reliable than chain transmissions.

It is preferred that each first gear assembly comprises a driven gear and a driving gear, the driven gear meshing with the first gear, and the driving gear meshing with either the second gear or the third gear. Thereby, the transmission will be compact, rugged and can easily be made to stand heavy loads.

The wall saw preferably further includes two additional gear assemblies arranged to be driven in parallel by the first gear and to drive the first two gear assemblies, and a spline coupling connecting the motor output shaft to the first gear, so that the first gear can slide between a first position, where it is operatively connected directly to the two first gear assemblies for rotating the second gear at a first speed, and a second position where it is operatively connected directly to the two additional gear assemblies and thereby indirectly to the two first gear assemblies for rotating the second gear at a second different speed. Thereby, a compact and rugged two-speed transmission will be achieved, which easily can be made to stand heavy loads.

Like the two first gear assemblies, each additional gear assembly comprises a driven gear, hereafter referred to as a second driven gear, and a second driving gear, hereafter referred to as a second driving gear. The second driven gears of the additional gear assemblies mesh with the first gear, while the second driving gears of the additional gear assemblies mesh with the driven gears of the two first gear assemblies. Thereby, the transmission will be compact, rugged and can easily be made to stand heavy loads. For shifting the first gear between the two positions on the motor output shaft, a gear shifter is provided. Preferably, all of the gears in the transmission are selected so as to give a total speed reduction ratio on the order of 10:1 on "low gear", and a speed reduction ratio on the order of 7.5:1 on "high gear".

It is preferred that each first gear assembly comprises a fourth gear integral with a coaxial shaft and forming said driven gear, a fifth gear mounted to be able to rotate on the coaxial shaft and forming said driving gear, a friction clutch disk clamped axially between the fourth gear and the fifth gear, and a mechanism for pressing the fifth gear with an adjustable pressure against the friction clutch disk to permit transfer of torque from the fifth gear to the fourth gear. Such a gear assembly with said adjustable friction saw protection clutch is compact, rugged and can easily be made to stand heavy loads.

Suitably, a clutch transfer plate is fixed on the coaxial shaft between the fourth gear and the friction clutch disk. Thereby the friction clutch disk does not have to engage an axial end face of the fourth gear.

To make the friction clutch adjustable, the coaxial shaft suitably has a free end extending axially from the fifth gear, the free end having a thread, a nut engaging the thread, and a Belleville washer clamped between the nut and the fifth gear, whereby the degree of tightening of the nut determines at what torque the saw blade will stop rotating.

To secure the nut against loosening, means may be provided for locking the nut against unintentional rotation on the coaxial shaft. The means preferably include a non-circular cross-section of the threaded portion, an external tooth lock washer having a matching central hole mounted on the threaded portion between the Belleville washer and the nut, and a plurality of peripheral surface portions on the nut offering a grip for a tool for tightening/loosening the nut. The number of teeth on the lock washer and the number of grip offering surface portions on the nut are sufficient to permit locking of the nut in almost any position on the threaded portion by bending at least one of the teeth against one of the surface portions.

To achieve the compact design, the first and fifth gears may be selected to give a speed reduction ration in the order of 3:2, and the fourth gear and the gear driven thereby may be selected to give a speed reduction ratio in the order of 5:1. This results in a preferred over all speed reduction ratio in the order of 7.5:1 from the drive motor to the rotatable tool.

The second and the third gears suitably are of substantially the same size, i.e. a gear ratio in the order of 1:1. Thereby, it will be easy to enclose the transmission in an arm-shaped housing.

In a preferred embodiment the drive motor is a permanent magnet motor. A permanent magnet motor has an advantageously high torque performance as compared to an induction motor of the same weight and size.

The permanent magnet motor can be arranged to perform a power output close to its maximum power output at substantially all rotational speeds within a speed interval of at least 1,000 rpm.

Preferably, the permanent magnet motor is arranged to perform a power output close to its maximum power output at substantially all rotational speeds within a speed interval of at least 3,000 rpm.

As an example the motor is arranged to perform a power output close to its maximum power output at substantially all rotational speeds between 6,000-9,000 rpm. This can be achieved by field weakening by tapping which is a technology known as such for permanent magnet motors and is not described in more detail in this context. However, in this particular application the field weakening by tapping results in several advantages.

The permanent magnet motor provides a range for each gear ratio, i.e. for each gear ratio the same optimal peripheral speed can be reached for several saw blade diameters. In this way the problem of keeping the peripheral speed of the saw blade constant, independently of saw blade diameter is minimized and the number of mechanical gears can be reduced. For example, one mechanical gear may handle saw blade diameters in a range of 600-1200 mm, and the second in the range of 1200-1600 mm, being able to keep the peripheral speed of the saw blade constant within the blade diameter ranges, while maintaining sufficient cutting power.

Another aspect of the invention is directed to a wall saw having a rotatable circular saw blade, a drive motor with an motor output shaft for rotating the saw blade, and a transmission for interconnecting the motor output shaft to the rotatable saw blade in order to transform an unsuitable high speed and low torque of the motor output shaft to a more useable lower speed with higher torque at the rotatable tool, wherein the drive motor is an electric motor having an available power output close to maximum power output at substantially all rotational speeds within an rotational speed interval of at least 1000 rpm, and wherein said drive motor at rotational speeds within said interval thereby also is adjustable to an rotational speed that via said transmission transfers to an optimal rotational speed and/or optimal peripheral speed of the saw blade.

The permanent magnet motor for this application might preferably be a servo motor, e.g. of the type used in industrial robots. In order to illustrate realistic figures of power outputs close to maximum power output throughout a wide rotational speed range a permanent magnet motor for a wall saw according to the present invention typically has a power output of about 11 kW at 6000 rpm increasing only slightly to a power output of about 13 kW at 9000 rpm. Thereby the motor also provides the functionality of a gearbox or variator, within a given gear ratio, in the meaning that in order to adjust saw blade rotational speed it is possible to adjust the motor rotational speed, still maintaining a high power output close the maximum power output. In this way the problem of keeping the peripheral speed of cutting segments of the saw blade constant, independently of saw blade diameter is reduced and the number of mechanical gears can be minimized.

The application of field weakening by tapping reduces the risk for over heating and/or burning of the motor windings. By way of example a motor having a power output of 11 kW at 6000 rpm would if no field weakening functionality was adopted deliver just about the same output torque at 6000 rpm as at higher rotational speeds up to 9000 rpm. This implies that the power output would be in the order of 50% higher at 9000 rpm than at 6000 rpm which would result in burning of the motor windings or else require a motor design dimensioned for much higher power output. Therefore, field weakening by tapping resolves the problem by limiting output torque at high rotational speed and limiting average current in motor windings at high rotational speed, and maintaining a generally constant power output over a wide rotational speed range (6000-9000 rpm). This solution also provides a possibility to use a relatively light weight and low cost permanent magnet motor with great flexibility in a wall saw.

By using a saw protective clutch the size and weight of the transmission can be reduced. And they can be further reduced by using a permanent magnet motor. A typical wall saw as discussed above can therefore have a total weight of only 25 kg, to compare with approximately 40 kg for a corresponding conventional wall saw. This is important as the saw is carried to the work site and mounted there. Further the more compact transmission makes it possible to cut closer to the rack, closer than 190 mm, preferably closer than 170 mm, to compare with 205 mm for a corresponding conventional wall saw. This is a distinct advantage.

BRIEF DESCRIPTION OF THE DRAWINGS

In the following, the invention will be described in more detail with reference to preferred embodiments and the appended drawings.

FIG. 4 is a side view of a friction saw protection clutch shown in FIG. 3.

FIG. 5 is a longitudinal cross sectional view of the friction saw protection clutch of FIG. 4.

FIG. 6 is a partly exploded perspective view of an alternative embodiment of the friction saw protection clutch.

MODE(S) FOR CARRYING OUT THE INVENTION

Broadly, the present invention relates to a construction machine having a drive motor, a rotatable tool driven by the drive motor, and a transmission for interconnecting an motor output shaft of the drive motor to the rotatable tool in order to transform an unsuitable high speed and low torque of the drive motor output shaft to a more useful lower speed with higher torque at the rotatable tool. An exemplary embodiment of such a construction machine is a wall saw having a motor, a circular saw blade driven by the motor, and a transmission for interconnecting a motor output shaft to the rotatable saw blade. In spite of its name, a wall saw might as well be used for sawing through a floor or a ceiling.

Figure 1:
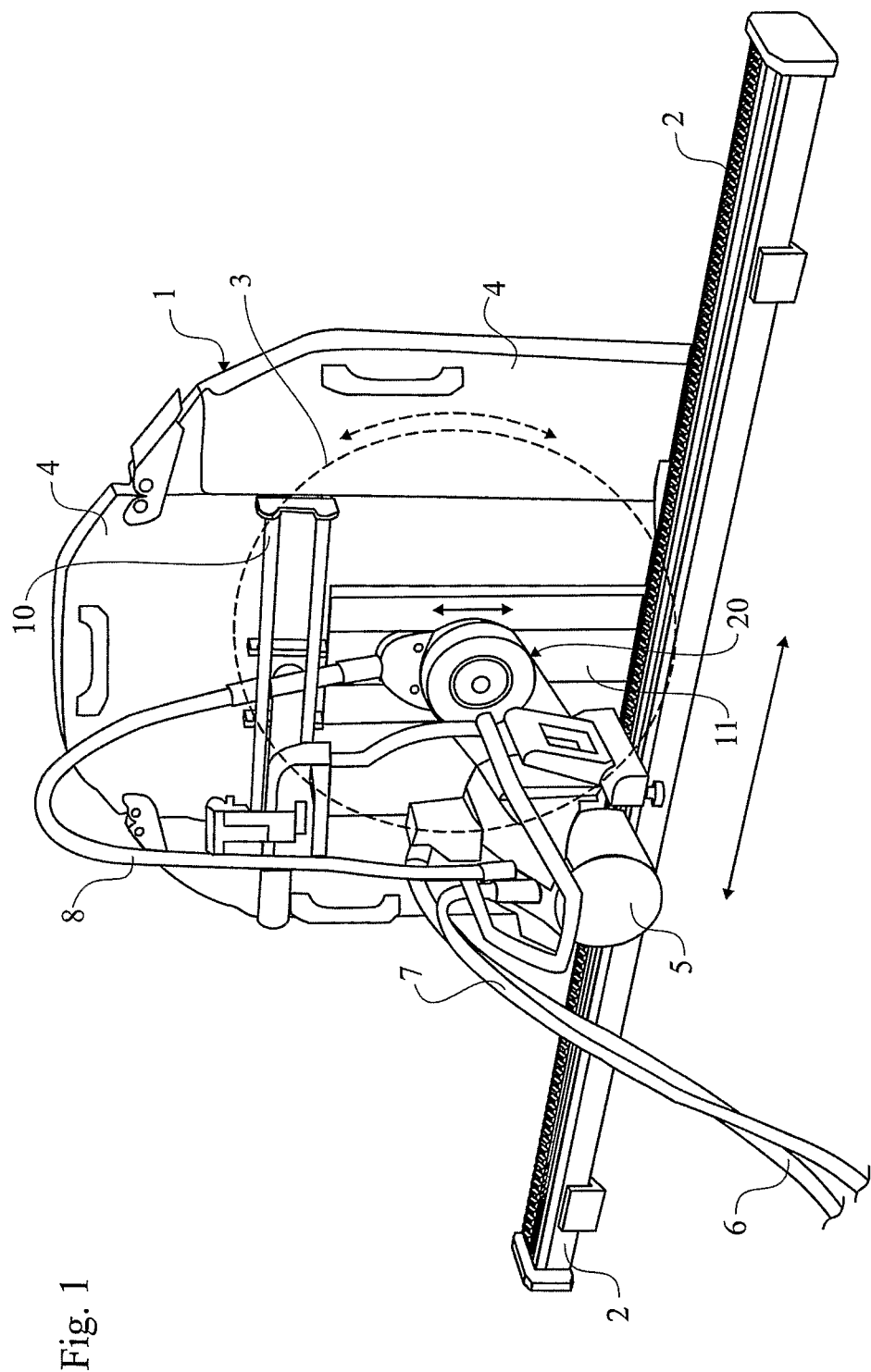
FIG. 1 is a perspective view of a wall saw movable along a toothed rack and having a circular saw blade driven by a motor via a transmission according to preferred embodiment of the present invention.

FIG. 1 is a perspective view of a wall saw assembly, which is positioned to saw through a floor. The wall saw assembly includes a wall saw 1 that is movable along a toothed rack 2 and has a circular saw blade 3 inside a protective hood 4, and, therefore, shown in a dashed line, and driven by a motor 5 via a transmission 20 according to a preferred embodiment of the present invention.

In the shown embodiment, the wall saw has two additional motors, not shown, one for moving the wall saw 1 along the toothed rack 2, which is intended to be mounted on the "wall" where an opening is to be sawed, and the other motor for raising and lowering the saw blade 3. A cable 6 is connected to the motor 5 for supplying power to the motors and for transferring control data between a control unit, not shown, and the motors. Cooling water is fed to the motor 5 through a first hose 7, and through a second hose 8 it is passed on to a central area of the saw blade 3 to cool the saw blade and bind dust formed on sawing.

Figure 2:
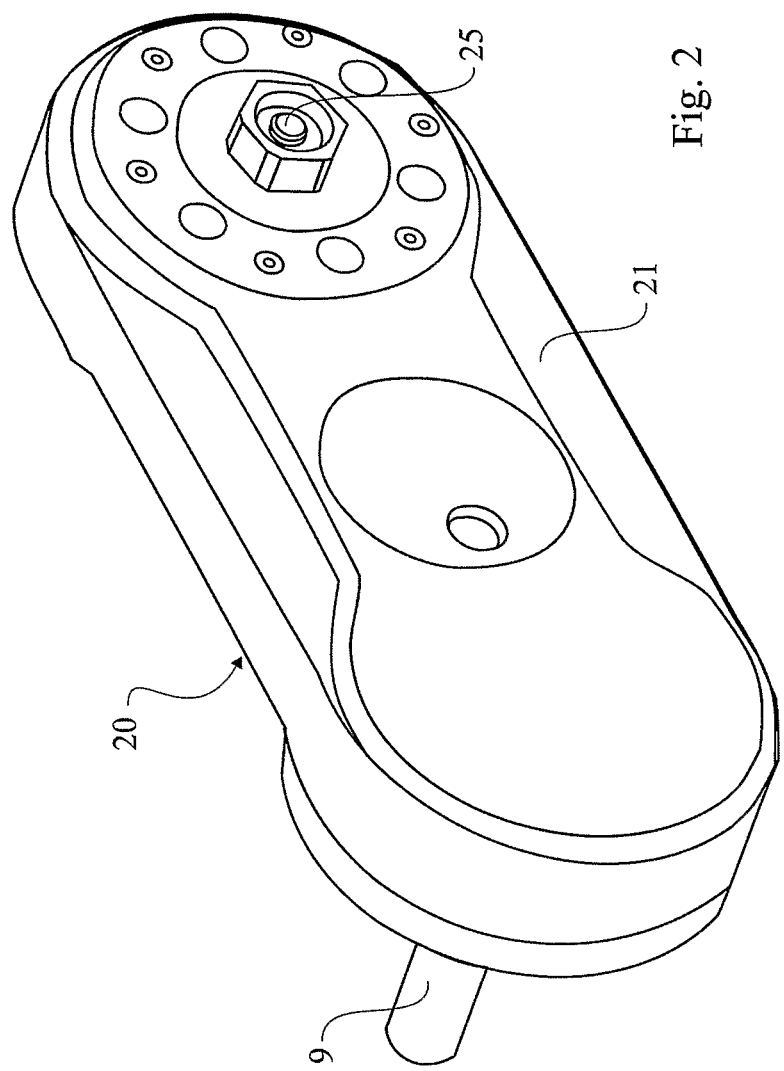
FIG. 2 is a perspective view of a housing of the transmission shown in FIG. 1.

The transmission 20 includes an arm-shaped housing 21, which is best shown in FIG. 2 and has two ends. The first end is connected to a motor output shaft 9 of the motor 5, and the other end is connected to a gear output shaft 25, on which the saw blade 3 is to be mounted. On raising and lowering the saw blade 3, the transmission housing 21 will be turned on a pivotal axis that is coaxial with a rotation axis of the motor output shaft 9, and said other end of the housing, which carries the saw blade 3, will move in an arc. To permit the arcuate movement of the saw blade 3 inside the protective hood 4, the wall saw is provided with a guide arrangement 10 permitting the hood 4 a limited horizontal movement relative to the motor 5 (as seen in FIG. 1), and the hood 4 also has a vertical slot 11 that permits the gear output shaft 25 for the saw blade 3 to move vertically. When sawing in a vertical wall instead of a horizontal floor the permitted movement of the hood 4 relative to the motor 5 is of course vertical instead of horizontal in this embodiment of the invention.

In accordance with the present invention, the transmission comprises two adjustable friction clutches 30-33 in parallel (see FIG. 5). An adjustable friction clutch protects the wall saw or other construction machine against large exterior forces, and by setting the adjustable friction clutch 30-33 at a desired predetermined value, you will limit the maximum size of the forces that the teeth and gears are exposed to. Thereby, the transmission 20 may be made more compact and less heavy. No over-dimensioning is necessary, and the transmission 20 will make out fine in rough environments.

Figure 3:
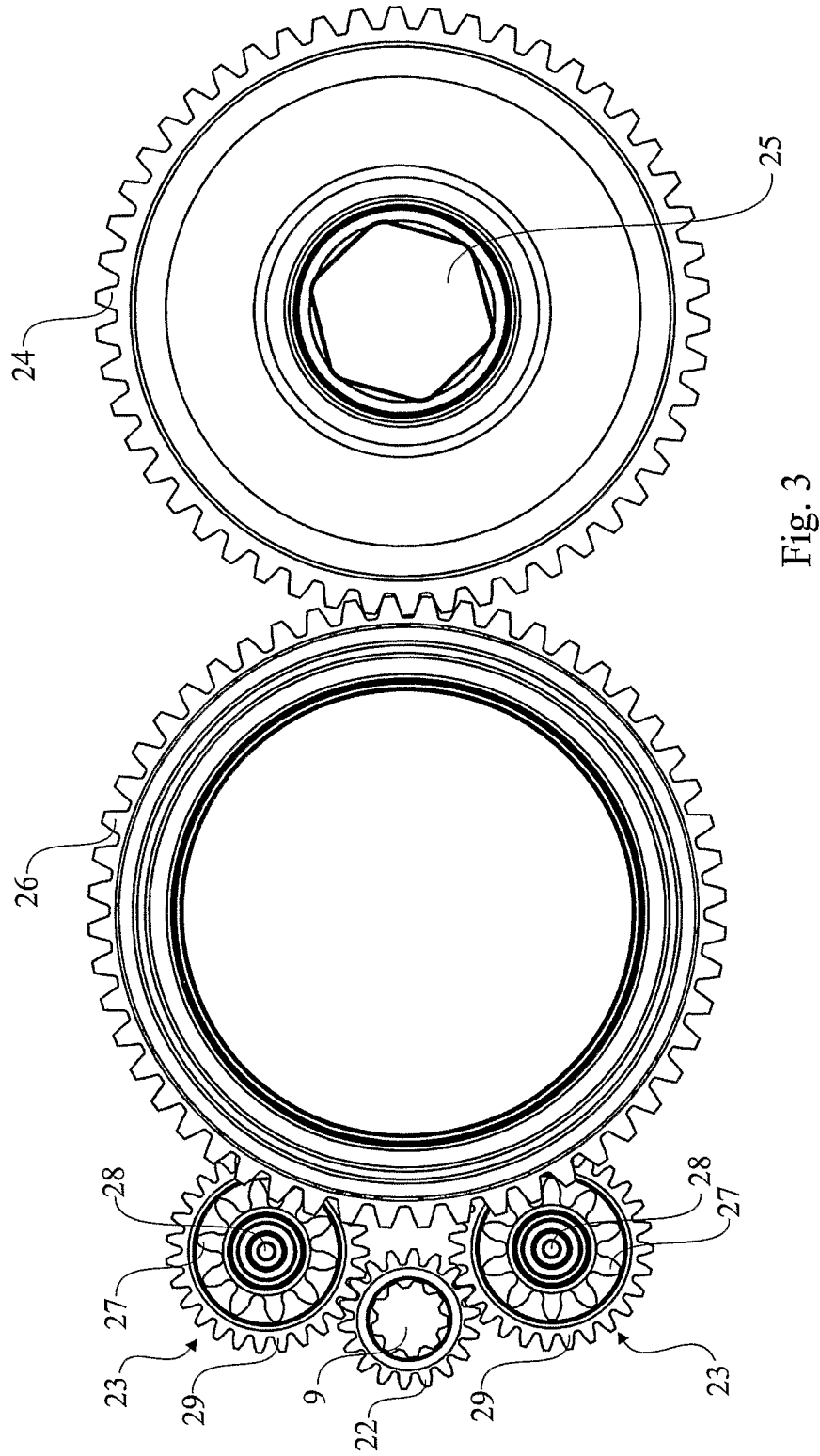
FIG. 3 is a plan view of the gears and the two friction saw protection clutches of the transmission inside the housing.

A preferred embodiment of the actual transmission inside the transmission housing 21 is shown in FIG. 3. A first gear 22 is mounted on the motor output shaft 9, which is shown as having a male spline for transferring large forces to the first gear 22 that has a matching female spline. Two first gear assemblies 23 are mounted to be driven in parallel by the first gear 22, and a common second gear 24 is mounted to be driven indirectly by the two first gear assemblies 23 in parallel. The second gear 24 has a gear output shaft 25 on which the saw blade 3 is intended to be mounted. Each first gear assembly 23 includes one of said adjustable friction saw protection clutches. This design contributes to a compact structure of the transmission 20.

Although a drive chain might be used for transferring the rotary force to the second gear 24, it is recommended that a third gear 26 is mounted interposed between the gear assemblies 23 and the second gear 24 to be driven by the gear assemblies 23 and drive the second gear 24. Gear transmissions are more reliable than chain transmissions.

As shown in detail in FIGS. 4 and 5, it is preferred that each first gear assembly 23 comprises a fourth gear 27 integral with a coaxial shaft 28 and constituting a driving gear, a fifth gear 29 mounted to be able to rotate on the coaxial shaft 28 and constituting a driven gear, a friction clutch disk 30 clamped axially between the fourth gear 27 and the fifth gear 29, and a mechanism 31-33 for pressing the fifth gear 29 with an adjustable pressure against the friction clutch disk 30 to permit transfer of torque from the fifth gear 29 to the fourth gear 27. Such a gear assembly with said adjustable friction saw protection clutch is compact, rugged and can easily be made to stand heavy loads.

To make the friction saw protection clutch adjustable, the coaxial shaft 28 suitably has a free end extending axially from the fifth gear 29, the free end having a threaded portion 31, a nut 32 engaging the thread 31 of the threaded portion, and a Belleville washer 33 clamped between the nut 32 and the fifth gear 29, whereby the degree of tightening of the nut 32 determines at what torque the saw blade 3 will stop rotating. Suitably, a clutch transfer plate 34 is fixed on the coaxial shaft 28 between the fourth gear 27 and the friction clutch disk 30. Thereby the friction clutch disk 30 does not have to engage an axial end face of the fourth gear 27. The clutch transfer plate 34 is locked against rotation on the coaxial shaft 28 in any suitable way. In the shown embodiment, the locking is accomplished by three equiangularly spaced balls 35, one of which is shown. Each ball 35 is located halfway into an individual recess in the coaxial shaft 28 and halfway into a corresponding individual recess in the clutch transfer plate 34.

To secure the nut 32 against loosening, nut locking means are preferably provided for locking the nut 32 against unintentional rotation on the coaxial shaft 28. In FIG. 6 a preferred embodiment is shown. Here, the nut locking means include a non-circular cross-section of the threaded portion 31, exemplified by two opposite located planar machined surfaces 145*a*, 145*b*, an external tooth lock washer 136 having a central hole 147 matching the non-circular cross-section 145*a*, 145*b* of the threaded portion 31 and mounted thereto between the Belleville washer 33 and the nut 32, and a plurality of peripheral recessed surface portions 148 on the nut 32 so that the lock washer 136 can be secured to the nut 32 by a securing means, here provided by bending at least one tooth 146 of the lock washer 33 against one of the surface portions 148. A hardened washer 149 is provided between the Belleville washer 33 and the lock washer 136 to protect the lock washer 136 from friction wear caused by the Belleville washer 33. The lock washer 136 in it self is not hardened since its teeth are to be bent. The number of teeth on the lock washer 136 and the number of surface portions 148 on the nut 32 are sufficient to permit locking of the nut 32 in almost any position on the threaded portion 31. Preferably the number of teeth 146 and the number of surface portions 148, summed together, is at least 5, more preferably at least 10, even more preferably at least 15. The peripheral recessed surface portions 148 also offer a grip for a tool for tightening/loosening the nut 32.

Further, other nut locking means for securing the nut 32 against loosening can also be used. For example, in an embodiment not shown, a castellated nut that has slots or notches cut into one end could be used. Then, one or two holes would be drilled through the threaded portion of the coaxial shaft, the nut would be torqued properly and then, if the slot is not aligned with the hole in the coaxial shaft, the nut is rotated to the nearest slot. The nut would then be secured with a cotter pin or safety wire. Further, a conventional hexagonal or square nut could also be used in combination with the toothed washer 136, by bending teeth towards the sides of the nut, i.e. having non-recessed surface portions.

The driven fifth gear 29 preferably meshes with the first gear 22, and the driving fourth gear 27 meshes with the gear driven by the two first gear assemblies 23, in the shown embodiment the third gear 26 that in its turn meshes with the second gear 24. Thereby, the transmission will be compact, rugged and can easily be made to stand heavy loads. However, as will be realized, the gear assemblies 23 might as well be of a design where the first gear 22 meshes with the gear that is rotatable on the coaxial shaft 28, and the gear that is integral with the coaxial shaft 28 meshes with the third gear 26. Further, all rotatable components of the transmission are, of course, mounted in suitable bearings, well known to a person skilled in the art and not shown.

To achieve the compact design, the first and fifth gears, 22 and 29, respectively, may be selected to give a speed reduction ratio on the order of 3:2, and the fourth gear 27 and the gear driven thereby, in the shown embodiment the third gear 26, may be selected to give a speed reduction ratio on the order of 5:1. The second and the third gears, 24 and 26, respectively, suitably are of substantially the same size. Thereby, it will be easy to enclose the transmission in an arm-shaped housing 21.

Figure 7:
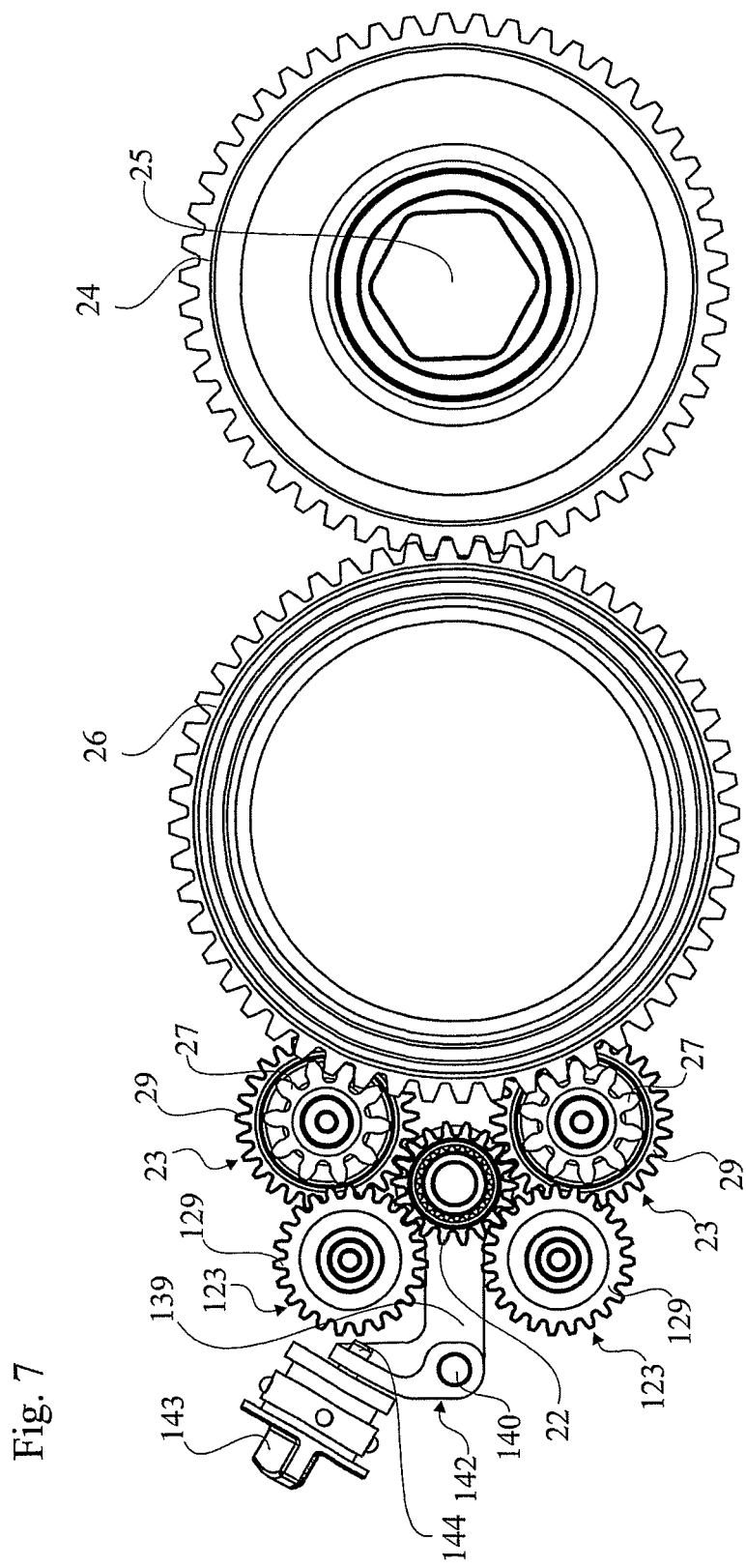
FIG. 7 is a side view of a second preferred embodiment of the gears and the friction saw protection clutches of a two-speed transmission.
Figure 8:
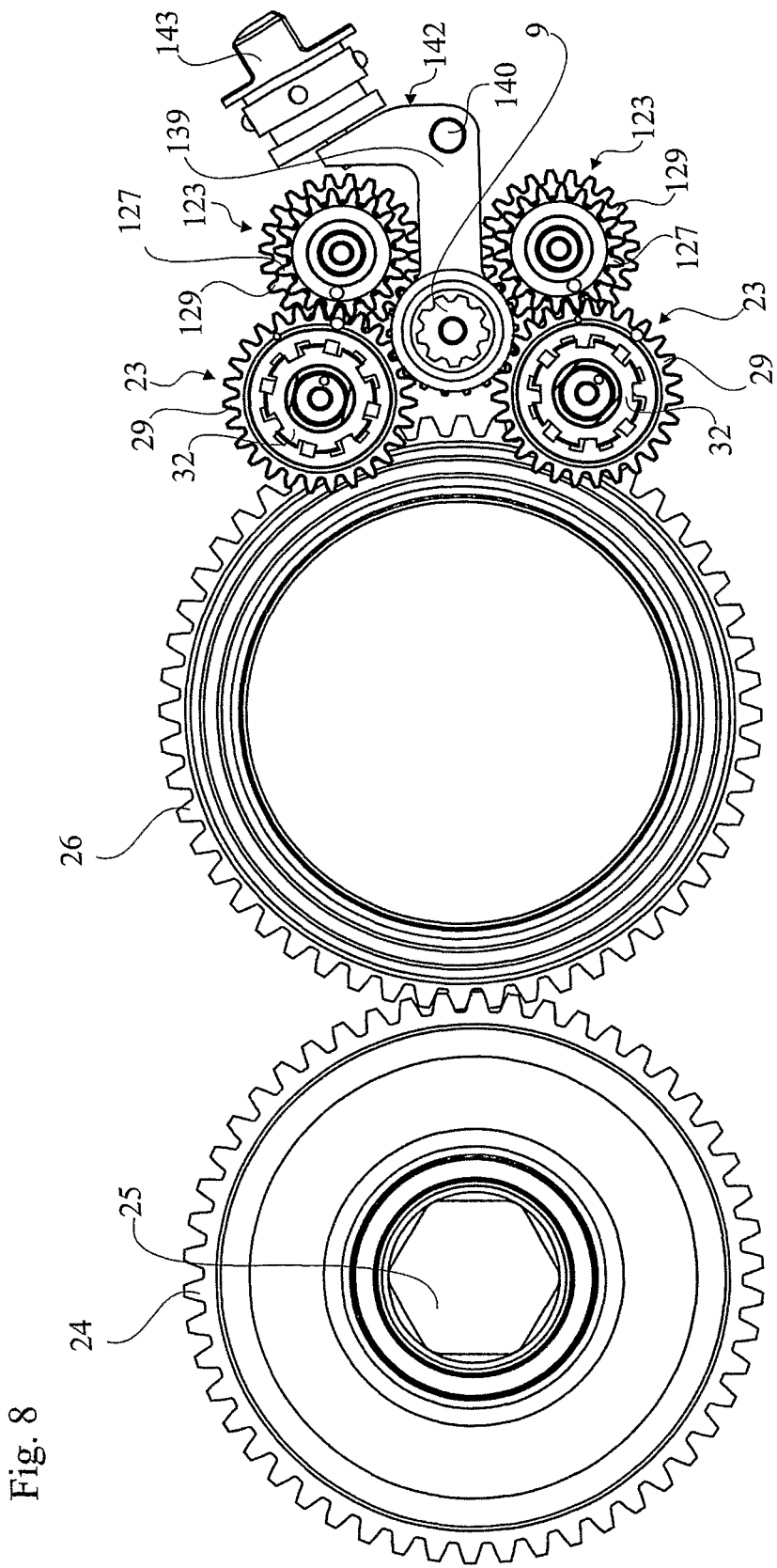
FIG. 8 is a side view of the embodiment shown in FIG. 7 but taken from the opposite side.
Figure 9:
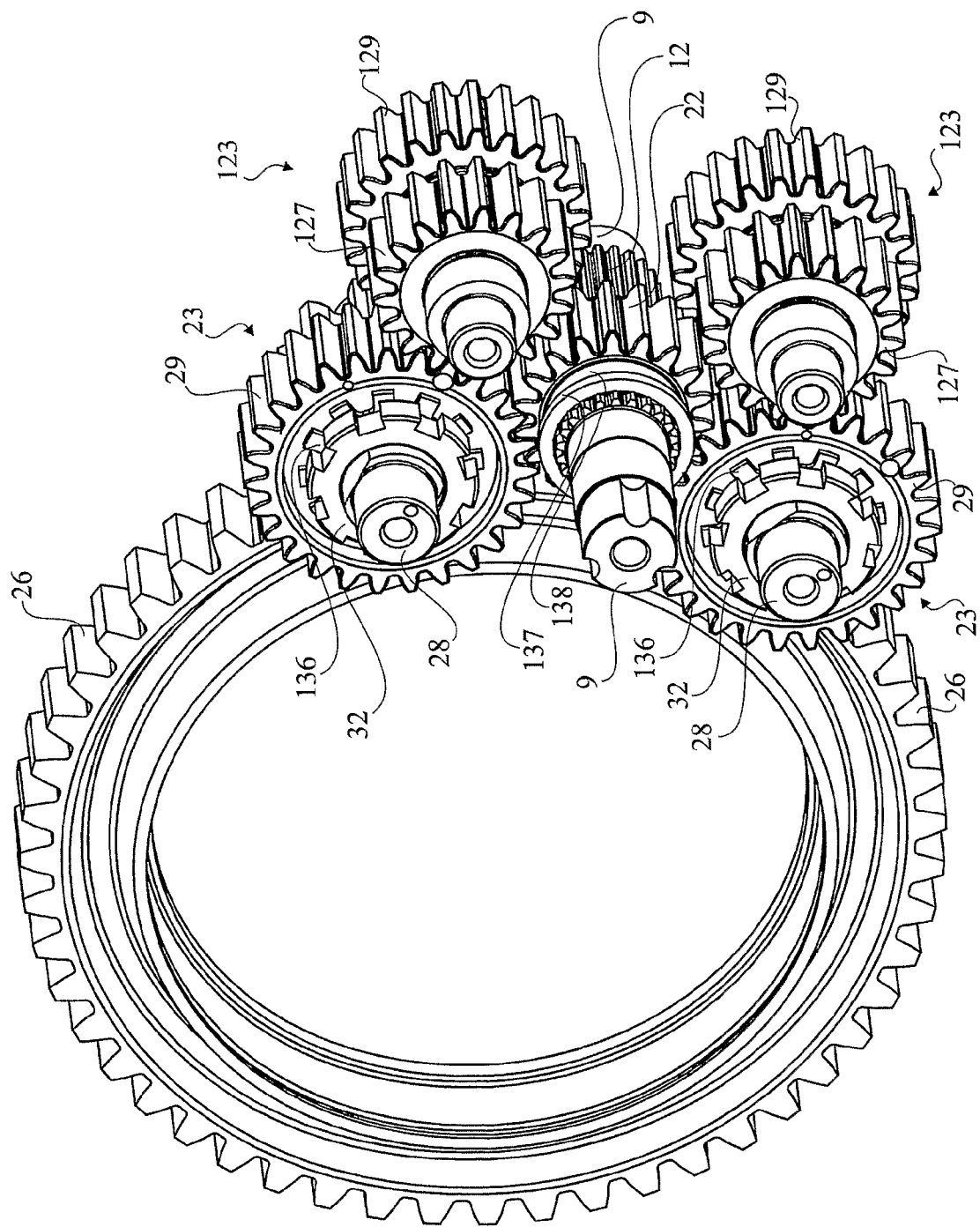
FIG. 9 is a perspective view of the gears and the friction saw protection clutches of the two-speed transmission of FIGS. 7 and 8.

FIGS. 7 to 9 show a preferred embodiment of the gears and the friction saw protection clutches where the present invention is applied to a two-speed transmission. Since many components and their functions remain the same in the two-speed transmission as in the single-speed transmission, on the whole only the differences will be described below. The two-speed transmission increases the operational range of the saw, i.e. allowing for a wider range of saw blade diameters, while still keeping a compact and low weight gearbox.

In the two-speed transmission, two additional gear assemblies 123 are arranged to be driven in parallel by the first gear 22 and to drive the first two gear assemblies 23. The male splines on the motor output shaft 9 and the female splines in the first gear 22 form a splined coupling 12 connecting the motor output shaft 9 to the first gear 22, so that the first gear 22 can slide between a first position, where it is operatively connected directly to the two first gear assemblies 23 for rotating the second gear 24 at a first speed, and a second position where it is operatively connected directly to the two additional gear assemblies 123 and thereby indirectly to the two first gear assemblies 23 for rotating the second gear 24 at a second different speed.

Each additional gear assembly 123 comprises a second driven gear 129 and a second driving gear 127, and the second driven gears 129 of the additional gear assemblies 123 mesh with the first gear 22, while the second driving gears 127 of the additional gear assemblies 123 mesh with the driven gears 29 of the two first gear assemblies 23. Like in the single-speed transmission, the gears in the two-speed transmission may be selected to give a reduction ration between the first gear 22 and the second driven gear 129 substantially on the order of 3:2, and the gears in the gear train between the second driving gear 127 and the second gear 22 may be selected to give a speed reduction ratio on the order of 5:1. All of the gears in the transmission are selected so as to give a total speed reduction ratio on the order of 10:1 on "low gear", and a speed reduction ratio on the order of 7.5:1 on "high gear". In the embodiment shown in the drawings, the various gears have the following number of teeth:

| | Gear No. | | | | | | |
|---|---|---|---|---|---|---|---|
| | 22 | 29 | 27 | 129 | 127 | 26 | 24 |
| Number of teeth | 18 | 27 | 10 | 23 | 18 | 52 | 50 |

The two additional gear assemblies 123 do not include adjustable friction saw protection couplings. The force transferred from the motor output shaft 9 to the saw blade 3 always passes through the friction saw protection couplings 30-33 of the two first gear assemblies 23 and they should be set for the high torque provided by the "low gear" that will rotate the saw blade at a low rotational speed. As usual, the "high gear" will give less torque but higher speed. In "high gear", the force from the motor output shaft 9 will follow the same path as in the single-speed transmission, but in "low gear", the path will pass through the additional gear assemblies 123 to the first gear assemblies 23 and so on.

FIG. 9 shows the first gear 22 displaced to the "high gear" position on motor output shaft 9, where the first gear 22 is in engagement with the two driven gears 29 in the first gear assemblies 23. Via the adjustable friction saw protection clutches the rotation is transferred to the driving gears 27 of the first gear assemblies 23, which drive the second gear 24 either directly or via the third gear 26. The splined coupling 12 between the first gear 22 and the motor output shaft 9 is sufficiently loose to make it possible to shift the location of the first gear 22 to a "low gear" position at the right hand side of the motor output shaft 9 as viewed in FIG. 9. In the "low gear" position, the first gear 22 is in engagement with the two second driven gears 129 of the additional gear assemblies 123. These second driven gears 129 drive the second driving gears 127, which in their turn drive the driven gears 29 of the first gear assembly 23. From there, the rotation is transferred as described above for the "high gear" alternative.

Figure 10:
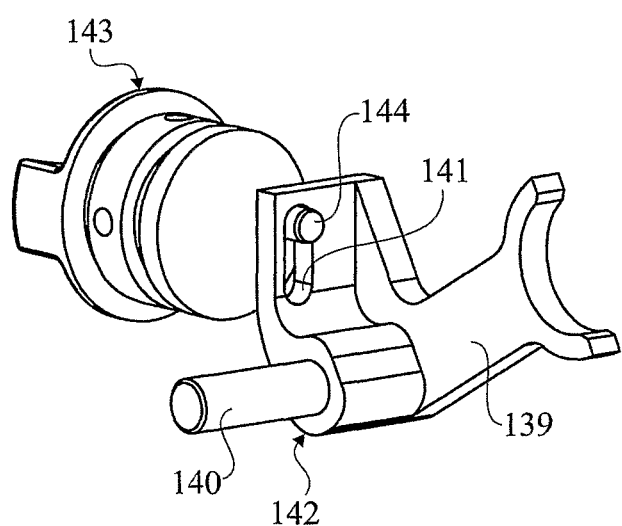
FIG. 10 is a perspective view of a gear shifter used for selecting low or high gear in the two-speed transmission.

A gear shifter 141 shown in FIGS. 7 and 8 but best shown in FIG. 10 is provided for shifting the first gear 22 between the two positions on the motor output shaft 9. Note that the first gear 22 drives either the driven fifth gear 29 of the first gear assembly 23 or the second driven gear 129 of the additional gear assembly 123, never both of them simultaneously. As is best shown in FIG. 9, at one axial side, the first gear 22 has an axially projecting sleeve 137 provided with a peripheral groove 138. The gear shifter 142 has a substantially L-shaped two-pronged fork 139, the prongs of which fit in the groove 138 and grip the sleeve 137 for axial movement of the first gear 22. The fork 139 is axially movable on a shaft 140 that is parallel to the motor output shaft 9. At its non-forked end, the substantially L-shaped fork 139 has a slot 141 extending at a right angle to shaft 140. The gear shifter 142 further has a rotary gear selector knob 143, which has an eccentrically placed projecting pin 144 that fits in and is movable in the slot 141 so as to cause the fork 139 to move along shaft 140 upon rotation of the knob 143. This will either exclude the additional gear assembly 123 from or include it into the force path from the motor output shaft 9 of the motor to the saw blade 3. Note, that by shifting the first gear 22 between the two positions on the motor output shaft 9, the direction of rotation of the gear output shaft 25 is changed. To compensate for the resulting change of direction of rotation, it is preferred that shifting the first gear 22 between the two positions on the motor output shaft 9 initiates a pole shift of the electric motor 5, e.g. by having a switch activated by the knob 143.

In one embodiment of the present invention, the motor 5 is a permanent magnet motor with a maximum power output of about 13 kW. 13 kW power is obtain at about 9,000 rpm. The power output is kept close to maximum all the way down to 6,000 rpm, where the power output is about 11 kW. This is achieved by means of applying field weakening by tapping at high rotational speeds and thereby also reducing average current in the motor windings to prevent over heating or burning. While in this embodiment the available power output is maintained close to maximum power output in a speed interval of 3,000 rpm (between 6,000-9,000 rpm), it might also be suitable to provide a wall saw 1 with a motor 5 performing an available power output close to maximum power output over a wider or a narrower speed interval, i.e. over an interval of 1,000 rpm. The range of saw blade diameters to be used in a specific wall saw should be considered when adapting the field weakening of the motor 5 to a wide operational range for each gear ratio. In order to adjust saw blade rpm for optimal peripheral speed of cutting segments, the rpm of the motor 5 is easily adjusted, still maintaining a power output close to the maximum power output of the motor. A permanent magnet motor with the performance described above typically has a weight of just about 8 kg.

In a further embodiment of the invention the permanent magnet motor as described in preceding paragraph above can be provided in wall saws comprising other kinds of transmissions than those described previously. For example the parallel friction saw protection clutch may be omitted or replaced by any other overload protection already known in the art. More specifically, such a wall saw according to the invention comprises a rotatable circular saw blade 3, a drive motor 5 with a motor output shaft 9 for rotating the saw blade 3, and a transmission 20 for interconnecting the motor output shaft 9 to the rotatable saw blade 3 in order to transform an unsuitable high speed and low torque of the motor output shaft 9 to a more useful lower speed with higher torque at the rotatable tool 3, wherein the drive motor 5 is an electric motor having an available power output close to its maximum power output at a wide operational speed range, so that the number of need gears can bed reduced.

Hence, the problems related to the requirement of a variable transmission ratio from motor to saw blade is solved. A mechanical gearbox which is compact, of low weight, having a simple design saving cost, and service demand and increases flexibility of the wall saw. Likewise no continuously variable transmission like a controlled planetary gear set is required. Service costs are thereby reduced, and expensive oil pump systems for sufficient supply of lubrication and splash lubrication systems can be omitted.

As compared to induction motors traditionally used in wall saws the application of a permanent magnet motor has several further advantages. In induction motors the rotor temperature reaches very high levels. High temperature and high rotational speed can cause problems in bearings and shaft seals which can be subject to excessive wear etc. Another important advantage of the permanent magnet motor is that it normally works with higher torque at a relatively lower rotational speed than an induction motor. This reduces the speed reduction demands on the transmission.

Another advantage with the present transmission is that it does not require lubrication from an oil pump, which e.g. a planetary gear set does. Without an oil pump, changing the direction of the drive motor 5 can easily be done without adapting the oil pump to work in both directions, enabling the rotatable tool 3 to be rotated in both directions during work.

INDUSTRIAL APPLICABILITY

The transmission of the present invention is especially applicable in wall saws and similar construction machines, where a transmission that may be made more compact and less heavy than prior art transmissions is desired. Two adjustable friction clutches in parallel, can be set at a desired predetermined value, so as to limit the maximum size of the forces that the teeth and gears of the transmission are exposed to. Thereby, the transmission may be made more compact and less heavy. No over-dimensioning is necessary, and the transmission will make out fine in rough environments. The transmission may be of single-speed or two-speed type.

Providing a wall saw with a permanent magnet motor according to present invention as the drive motor for driving the saw blade via said transmission, is especially applicable for reducing weight of the motor and for gaining a generally constant power output of the motor over a wide range of rotational speeds. Thereby, the permanent magnet motor can also at least partially provide the functionality of a gearbox, reducing the number of needed mechanical gears. Thereby, the overall drive train can be made more compact and less heavy and more cost efficient to manufacture and maintain.

The invention claimed is:

1. A saw comprising a rotatable circular saw blade, a drive motor with an motor output shaft for rotating the saw blade, and a transmission for interconnecting the motor output shaft to the rotatable saw blade in order to change an unsuitable high speed and low torque combination of the motor output shaft to a more useful lower speed with higher torque at the rotatable tool, the transmission including a first gear mounted on the motor output shaft, two first gear assemblies arranged to be driven in parallel by the first gear, a second gear arranged to be driven by the two first gear assemblies in parallel, the second gear having a gear output shaft, on which the saw blade is intended to be mounted, each one of the first gear assemblies including one adjustable friction saw protection clutch.

2. A saw as claimed in claim 1, wherein the adjustable friction saw protective clutches are each being clamped by a nut, and nut locking means are provided for locking the nut against unintentional rotation.

3. A saw as claimed in claim 1 or 2, wherein the adjustable friction saw protective clutches are adapted to be able to provide a sliding torque of at least 2 times, and preferably at least 3 times the maximum torque of the drive motor.

4. A saw as claimed in claim 1, wherein the transmission has a single fixed ratio.

5. A saw as claimed in claim 1, wherein a third gear is mounted interposed between the first gear assemblies and the second gear to be driven by the first gear assemblies and drive the second gear.

6. A saw as claimed in claim 5, wherein each first gear assembly comprises a driven gear and a driving gear, the driven gear meshing with the first gear, and the driving gear meshing with either the second gear or the third gear.

7. A saw as claimed in claim 6, further including two additional gear assemblies arranged to be driven in parallel by the first gear and to drive the first two gear assemblies, and a splined coupling connecting the motor output shaft to the first gear, so that the first gear can slide between a first position, where it is operatively connected directly to the two first gear assemblies for rotating the second gear at a first speed, and a second position where it is operatively connected directly to the two additional gear assemblies and thereby indirectly to the two first gear assemblies for rotating the second gear at a second different speed.

8. A saw as claimed in claim 7, wherein each additional gear assembly comprises a second driven gear and a second driving gear, the second driven gears of the additional gear assemblies meshing with the first gear, while the second driving gears of the additional gear assemblies mesh with the driven gears of the two first gear assemblies.

9. A saw as claimed in claim 8, wherein a gear shifter is provided for shifting the first gear between the two positions on the motor output shaft.

10. A saw as claimed in claim 6, wherein all of the gears in the transmission are selected so as to give a total speed reduction ratio on the order of 10:1 on low gear, and a speed reduction ratio on the order of 7.5:1 on high gear.

11. A saw as claimed in claim 6, wherein each first gear assembly comprises a fourth gear integral with a coaxial shaft and forming said driven gear, a fifth gear mounted to be able to rotate on the coaxial shaft and forming said driving gear, a friction clutch disk clamped axially between the fourth gear and the fifth gear, and a mechanism for pressing the fifth gear with an adjustable pressure against the friction clutch disk to permit transfer of torque from the fifth gear to the fourth gear.

12. A saw as claimed in claim 11, wherein a clutch transfer plate is fixed on the coaxial shaft between the fourth gear and the friction clutch disk.

13. A saw as claimed in claim 11, wherein the coaxial shaft has a free end extending axially from the fifth gear, the free end having a threaded portion, a nut engaging the thread of the threaded portion, and a Belleville washer clamped between the nut and the fifth gear, whereby the degree of tightening of the nut determines at what torque the saw blade will stop rotating.

14. A saw as claimed in claim 13, wherein the nut locking means are provided for locking the nut against unintentional rotation on the coaxial shaft.

15. A saw as claimed in claim 14, wherein said nut locking means include:
  a. a non-circular cross-section of the threaded portion,
  b. an external tooth lock washer having a matching central hole mounted on the threaded portion between the Belleville washer and the nut, and
  c. securing means for securing the washer to the nut.

16. A saw as claimed in claim 15, wherein the securing means include:
   a. a least one tooth extending from the periphery of the washer, and
   b. a at least one peripheral surface portions on the nut,
   and where the number of teeth on the lock washer and the number of surface portions on the nut being sufficient to permit locking of the nut in almost any position on the threaded portion by bending at least one of the teeth against one of the surface portions.

17. A saw as claimed in claim 16, wherein the number of teeth and the number of surface portions, summed together, is at least 5.

18. A saw as claimed in claim 17, wherein the first and fifth gears, are selected to give a speed reduction ratio on the order of 3:2, and the fourth gear and the third gear or the second gear driven thereby are selected to give a speed reduction ratio on the order of 5:1.

19. A saw as claimed in claim 18, wherein the second and the third gears are of substantially the same size.

20. A saw as claimed in claim 19, wherein the transmission is mounted in an arm-shaped housing, which can be turned on a pivotal axis that is coaxial with a rotation axis of the motor output shaft of the motor.

21. A saw as claimed in claim 20, wherein the drive motor is an electric motor, preferably a permanent magnet motor.

22. A saw as claimed in claim 21, wherein the electric motor is arranged to perform a power output close to its maximum power output at substantially all rotational speeds within a speed interval of at least 1,000 rpm.

23. A saw as claimed in claim 22, wherein the electric motor is arranged to perform a power output close to its maximum power output at substantially all rotational speeds within a speed interval of at least 3,000 rpm.

24. A saw as claimed in claim 21, wherein the permanent magnet motor is arranged to perform a power output close to its maximum power output at substantially all motor rotational speeds between 6,000 rpm and 9,000 rpm, said motor.

25. A saw as claimed in claim 21, wherein said motor is arranged for field weakening by tapping, for obtaining a continuous maximum power output over a certain range of rotational speeds.

26. A saw as claimed in claim 1, wherein the drive motor and the transmission both are arranged so that the rotatable tool can be rotated in both directions during work by changing the direction of the drive motor.

* * * * *